US012319253B2

(12) United States Patent
Plow et al.

(10) Patent No.: US 12,319,253 B2
(45) Date of Patent: Jun. 3, 2025

(54) PARKING BRAKE APPARATUS FOR A VEHICLE AND METHOD THEREFOR

(71) Applicant: Bendix Commercial Vehicle Systems LLC, Avon, OH (US)

(72) Inventors: William Plow, Avon, OH (US); Hans Baumgartner, Moosburg (DE); Zsombor Gyorke, Budakeszi (HU); János Tóth, Kecskemét (HU); Sven Krueger, Munich (DE); Levente Hos, Budapest (HU); Michael Blessing, Munich (DE); Andreas Buch, Taufkirchen (DE)

(73) Assignees: KNORR BREMSE SYSTEME FÜR NUTZFAHRZEUGE GMBH, Munich (DE); Bendix Commercial Vehicle Systems LLC, Avon, OH (US)

( * ) Notice: Subject to any disclaimer, the term of this patent is extended or adjusted under 35 U.S.C. 154(b) by 809 days.

(21) Appl. No.: 17/557,149

(22) Filed: Dec. 21, 2021

(65) Prior Publication Data
US 2023/0192057 A1   Jun. 22, 2023

(51) Int. Cl.
*B60T 13/74* (2006.01)
*B60T 7/12* (2006.01)
(Continued)

(52) U.S. Cl.
CPC .............. *B60T 13/746* (2013.01); *B60T 7/12* (2013.01); *B60T 13/748* (2013.01); *F16D 65/12* (2013.01);
(Continued)

(58) Field of Classification Search
CPC ........ B60T 13/746; B60T 13/748; B60T 7/12; B60Y 2200/141; B60Y 2400/81;
(Continued)

(56) References Cited

U.S. PATENT DOCUMENTS

| 3,498,417 A | * | 3/1970 | Franz | ...................... B60T 1/062 |
| | | | | 192/111.15 |
| 8,521,388 B2 | * | 8/2013 | Baehrle-Miller | ....... B60T 7/042 |
| | | | | 701/70 |

(Continued)

FOREIGN PATENT DOCUMENTS

KR   20100063681   *   6/2010   ................ B60T 7/20

*Primary Examiner* — Christopher P Schwartz
(74) *Attorney, Agent, or Firm* — Cheryl L. Greenly; Brian E. Kondas; Geoffrey A. Kudlo

(57) ABSTRACT

A parking brake apparatus is provided for a vehicle including a vehicle drive train that extends between a vehicle propulsion engine and a vehicle wheel. The parking brake apparatus comprises a wheel drum located away from the vehicle wheel and fixedly attached to a drivetrain shaft that extends along a portion of the vehicle drive train between the vehicle propulsion engine and the vehicle wheel. The parking brake apparatus also comprises activatable drum brake components disposed in an interior chamber of the wheel drum. When activated, the drum brake components apply a clamping force to the wheel drum to prevent the wheel drum and the drivetrain shaft fixedly attached thereto from rotating and thereby preventing the vehicle wheel from rotating to provide the vehicle with a parking brake functionality.

10 Claims, 10 Drawing Sheets

(51) Int. Cl.
    *F16D 65/12*      (2006.01)
    *F16D 65/28*      (2006.01)
    *F16D 65/02*      (2006.01)
    *F16D 125/18*    (2012.01)

(52) U.S. Cl.
    CPC ........ *F16D 65/28* (2013.01); *B60Y 2200/141* (2013.01); *B60Y 2400/81* (2013.01); *F16D 2065/13* (2013.01); *F16D 2125/18* (2013.01)

(58) Field of Classification Search
    CPC .. F16D 2065/13; F16D 2125/18; F16D 65/12; F16D 65/29
    USPC ...... 188/156–164; 192/215, 218, 219, 219.1, 192/219.4, 219.5, 220, 220.2, 220.4, 192/221.1, 222, 223, 223.1, 223.3
    See application file for complete search history.

(56) References Cited

U.S. PATENT DOCUMENTS

| | | | |
|---|---|---|---|
| 11,059,463 B2 * | 7/2021 | Suzuki | B60T 7/045 |
| 2003/0132049 A1 * | 7/2003 | Kurttila | B60P 1/4478 |
| | | | 180/271 |
| 2008/0217123 A1 * | 9/2008 | Fujita | B60W 30/18109 |
| | | | 188/161 |
| 2009/0314590 A1 * | 12/2009 | Dagh | B60T 7/12 |
| | | | 188/110 |
| 2013/0087418 A1 * | 4/2013 | Han | B60T 7/107 |
| | | | 188/78 |

* cited by examiner

PARKING BRAKE APPARATUS FOR A VEHICLE AND METHOD THEREFOR

BACKGROUND

The present application relates to vehicle parking systems, and is particularly directed to a parking brake apparatus for a vehicle and method therefor, such as for a parking system of a commercial truck.

Vehicle parking systems for commercial trucks are known. One type of vehicle parking system for trucks uses a spring brake assembly that is enclosed in a parking brake housing portion. The parking brake housing portion is located behind a service brake housing portion that encloses service brake components including a service brake actuator having a certain length. The service brake housing portion and the parking brake housing portion form a common cylinder-shaped housing that combines the service brake function and the parking brake function. A parking brake actuator extends along the cylinder-shaped housing and has a length that is often double (or even more than double) the length of the service brake actuator. As such, the cylinder-shaped housing is relatively bulky and occupies a relatively large volume of space in the vicinity of the particular vehicle wheel at which the cylinder-shaped housing is located. Accordingly, those skilled in the art continue with research and development efforts in the field of parking systems of a vehicle, such as a commercial truck.

SUMMARY

In accordance with one embodiment, a parking brake apparatus is provided for a vehicle including a vehicle drive train that extends between a vehicle propulsion engine and a vehicle wheel. The parking brake apparatus comprises a wheel drum located away from the vehicle wheel and fixedly attached to a drivetrain shaft that extends along a portion of the vehicle drive train between the vehicle propulsion engine and the vehicle wheel. The parking brake apparatus also comprises activatable drum brake components disposed in an interior chamber of the wheel drum. When activated, the drum brake components apply a clamping force to the wheel drum to prevent the wheel drum and the drivetrain shaft fixedly attached thereto from rotating and thereby preventing the vehicle wheel from rotating to provide the vehicle with a parking brake functionality.

In accordance with another embodiment, a parking brake apparatus is provided for a vehicle including a vehicle drive train that extends between a vehicle propulsion engine and a vehicle wheel having a wheel hub mounted on an end portion of a wheel shaft. The parking brake apparatus comprises braking means disposed on a drivetrain shaft of the vehicle drive train at a location other than the end portion of the wheel shaft on which the wheel hub of the vehicle wheel is mounted. The parking brake apparatus also comprises control means for activating the braking means to provide a clamping force in an amount proportional to a gear-ratio of the vehicle drive train to provide a holding torque at the vehicle wheel to prevent the vehicle wheel from rotating and to thereby provide the vehicle with a parking brake functionality.

In accordance with yet another embodiment, a parking brake apparatus is provided for a vehicle including a wheel shaft, a drivetrain shaft having a portion which is other than an end portion of the wheel shaft on which a vehicle wheel is mounted, and a service brake for applying a braking force to the wheel shaft to reduce rotational speed of the vehicle wheel when the vehicle is in motion. The parking brake apparatus comprises a parking brake mechanism for, when the vehicle is stationary, activating a drum brake assembly to apply a clamping force to wheel drum that is fixedly attached to the drivetrain shaft portion to prevent rotation of the wheel drum and the drivetrain shaft, and thereby to provide the vehicle with a parking brake functionality. The parking brake apparatus also comprises a secondary brake mechanism for, when the vehicle is in motion, activating the service brake to apply a braking force to the wheel shaft to reduce rotational speed of the vehicle wheel, and thereby to provide the vehicle with a secondary brake functionality.

In accordance with still another embodiment, a method of operating a parking brake apparatus is provided for a vehicle including a vehicle drive train that extends between a vehicle propulsion engine and a vehicle wheel. The method comprises applying a clamping force in an amount based upon a gear-ratio relationship between the vehicle propulsion engine and the vehicle wheel to prevent a drivetrain shaft having a longitudinal central axis that extends along at least a portion of the vehicle drive train between the vehicle propulsion engine and the vehicle wheel from rotating about its longitudinal central axis, and thereby to park the vehicle.

DETAILED DESCRIPTION

The present application is directed to a parking brake apparatus for a vehicle such as a commercial truck. The specific construction of the parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
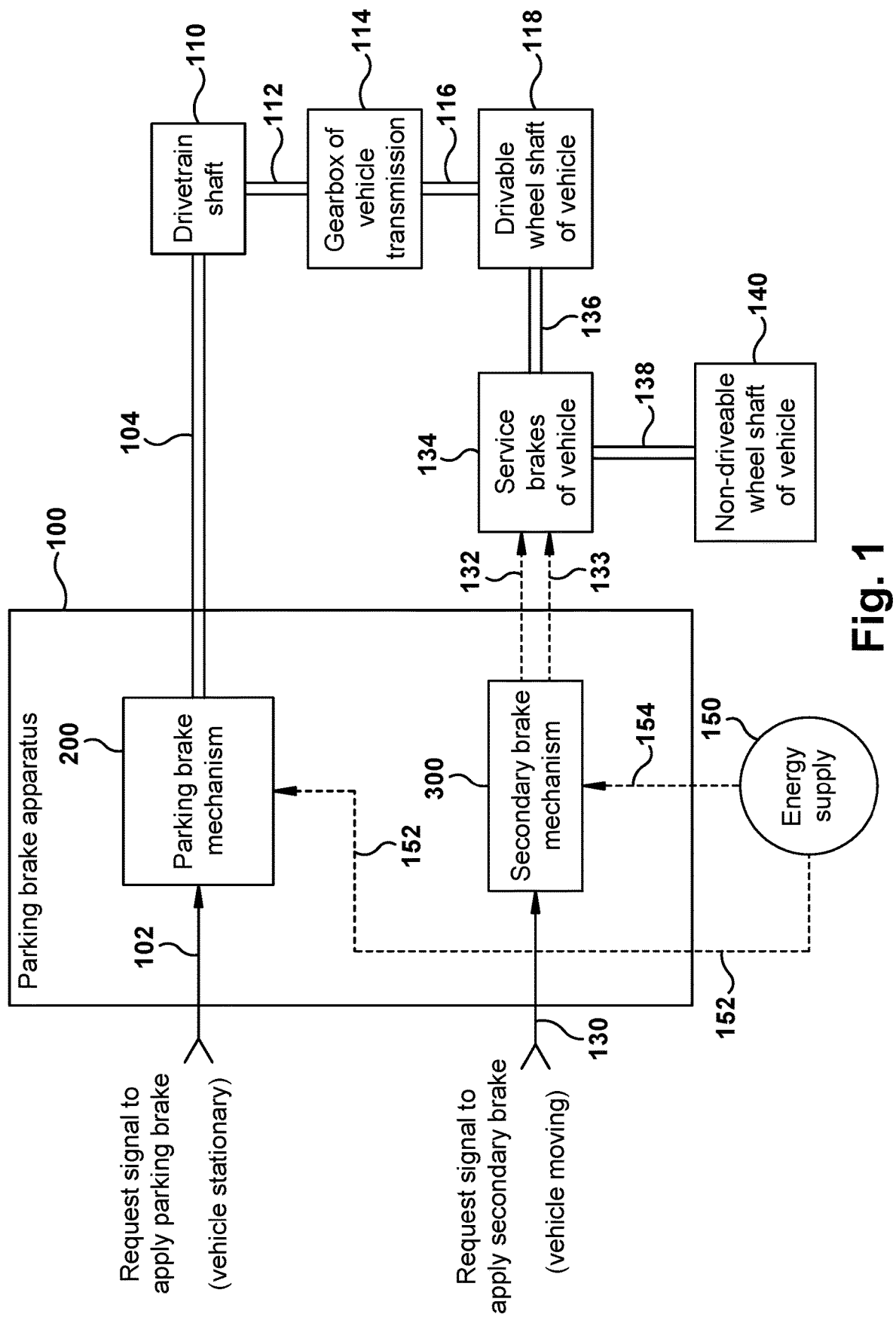
FIG. 1 is a schematic block diagram showing a parking brake apparatus constructed in accordance with an embodiment.

Referring to FIG. 1, a schematic block diagram showing a parking brake apparatus 100 constructed in accordance with an embodiment is illustrated. In FIG. 1, electrical line connections are shown as solid lines, energy line connections are shown as dashed lines, and mechanical couplings are shown as double solid lines.

The parking brake apparatus 100 includes an activatable parking brake mechanism 200 that provides a vehicle with parking brake functionality. More specifically, in response to a request signal on line 102 to apply the parking brake when the vehicle is stationary, the parking brake mechanism 200 provides sufficient force on line 104 to prevent rotation of a drivetrain shaft 110 that is coupled via line 112 to a gearbox 114 of a vehicle transmission. The gearbox 114 has one or more gear stages that are coupled via line 116 to a drivable wheel shaft 118 of the vehicle. When rotation of the drivetrain shaft 110 is prevented, the drivable wheel shaft 118 is prevented from turning. The parking brake is thereby applied, and the stationary vehicle is in a parked position.

The parking brake apparatus 100 further includes an activatable secondary brake mechanism 300 that provides the vehicle with secondary brake functionality. More specifically, in response to a request signal on line 130 to apply the secondary brake when the vehicle is moving, the secondary brake mechanism 300 provides energy on line 132 and line 133 to activate service brakes 134 of the vehicle. When activated, the service brakes 134 apply a braking force on line 136 to reduce rotational speed of the drivable wheel shaft 118. The service brakes 134 also apply a braking force on line 138 to reduce rotational speed of a non-drivable wheel shaft 140 of the vehicle. Structure and operation of the service brakes 134 to reduce rotational speed of the drivable wheel shaft 118 and to reduce rotational speed of the non-drivable wheel shaft 140 are known and conventional and, therefore, will not be described.

An energy supply 150 provides energy on line 152 to the parking brake mechanism 200, and provides energy on line 154 to the secondary brake mechanism 300. The energy supply 150 may comprise any type of energy supply, such as a pneumatic energy supply, an electrical energy supply, or a hydraulic energy supply. Other types of energy supplies are possible. Although a single energy supply is shown in FIG. 1, it is conceivable that one type of energy supply provides energy to the parking brake mechanism 200, and a different type of energy supply provides energy to the secondary brake mechanism 300. It is also conceivable that a redundant energy supply be used as a backup for the energy supply 150. For simplicity and purpose of description, only the one energy supply 150 is shown herein. Energy from the energy supply 150 is used for enabling operation of the parking brake mechanism 200 and operation of the secondary brake mechanism 300, as will be described hereinbelow.

Figure 2:
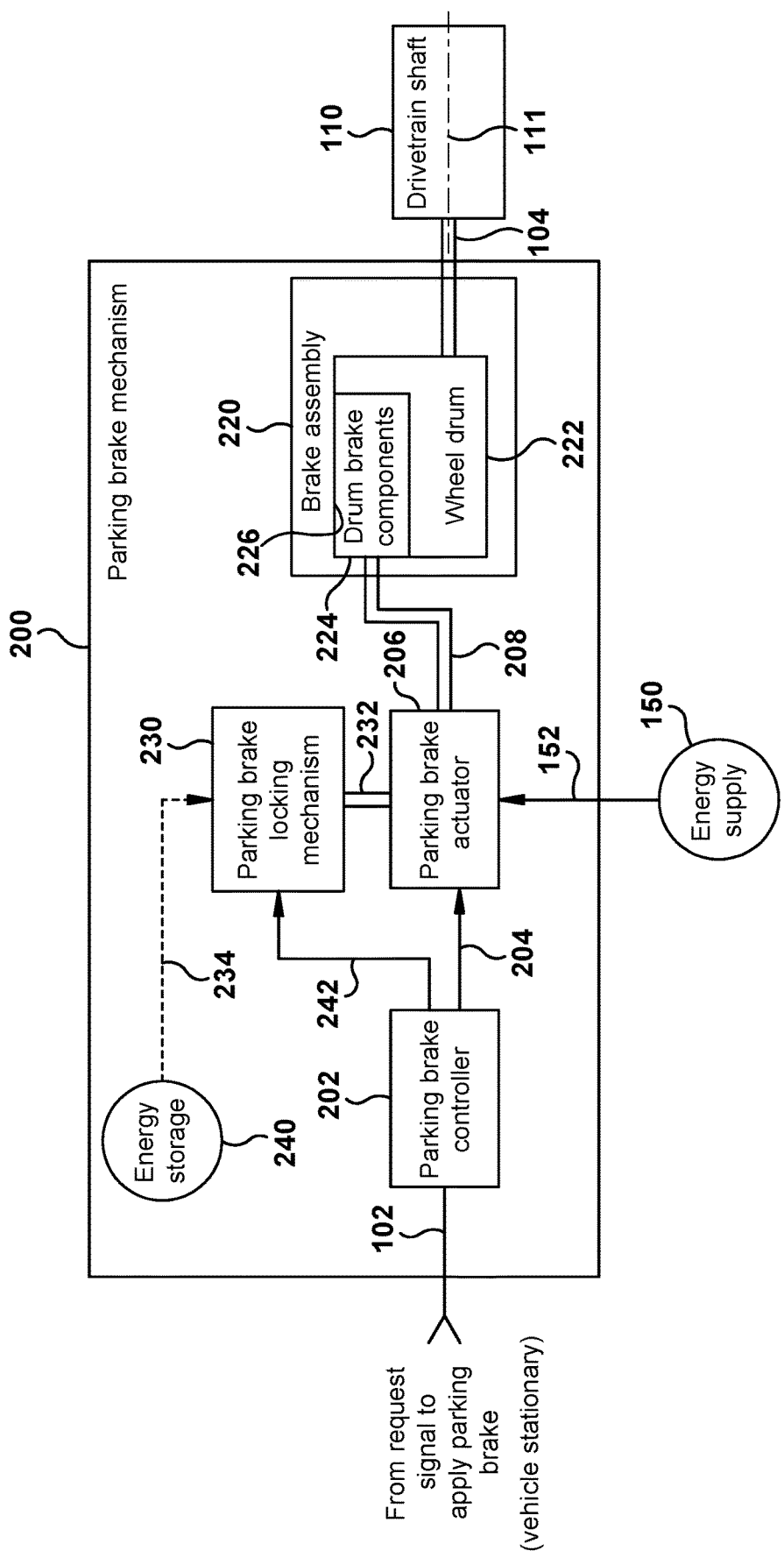
FIG. 2 is a schematic block diagram showing an embodiment of a parking brake mechanism used in the parking brake apparatus of FIG. 1.

Referring to FIG. 2, a schematic block diagram showing an embodiment of the parking brake mechanism 200 used in the parking brake apparatus 100 of FIG. 1 is illustrated. Parking brake mechanism 200 includes a parking brake controller 202 in the form of an electronic controller unit. In response to the request signal on line 102 to apply the parking brake when the vehicle is stationary, the parking brake controller 202 provides a signal on line 204 to activate a parking brake actuator 206. The parking brake actuator 206 is supplied with power on line 152 from the energy supply 150. When activated, the parking brake actuator 206 applies a force on line 208 to activate a brake assembly 220. The brake assembly 220 may comprise any type of brake assembly, such as a drum brake, a disc brake, or equivalent.

By way of example and for purposes of description herein, the brake assembly 220 includes a wheel drum 222 or similar, and activatable drum brake components 224 disposed in an interior chamber 226 of the wheel drum 222. For example, the brake assembly 220 may comprise an S-cam type of drum brake assembly. The wheel drum 222 is fixedly attached to the drivetrain shaft 110 (see also FIG. 1). The drum brake components 224 are fixedly attached to a frame part (not shown) of the vehicle. The parking brake controller 202 controls the parking brake actuator 206 to activate the drum brake components 224. Structure and operation of the parking brake controller 202, the parking brake actuator 206, and the drum brake components 224 to provide a clamping force to the wheel drum 222 to prevent rotation of the wheel drum 222 are known and conventional and, therefore, will not be described.

In accordance with an aspect of the present disclosure, the drum brake components 224, when activated, apply a clamping force to the wheel drum 222 to prevent both the wheel drum 222 and the drivetrain shaft 110 fixedly attached thereto from rotating about a longitudinal central axis 111 of the drivetrain shaft 110. This clamping force is applied via the line 104 to the drivetrain shaft 110, as shown in both FIG. 2 and FIG. 1. Since the drivetrain shaft 110 is prevented from rotating about its longitudinal central axis 111, the vehicle is parked in its parked position as described above with reference to FIG. 1.

As shown in FIG. 2, a parking brake locking mechanism 230 is a bistable mechanism and is provided for maintaining the vehicle in its parked position. The parking brake locking mechanism 230 is coupled via line 232 to the parking brake actuator 206. The parking brake locking mechanism 230 may comprise any type of known design. For example, in an actuator design which uses a cam, the locking function can be implemented using a pawl and spring or a pin and spring combination that locks a gear or a sprocket wheel. As another example, in an actuator design which uses a motor rotor, the locking function can be implemented using a bistable electromagnetic clutch that locks the actuator. Still as another example, in an actuator design which uses a self-locking mechanism, the locking function can be implemented with locking gears such as threaded spindles. Other types of locking mechanisms may be used. The locking function provided by the parking brake locking mechanism 230 allows the parking brake to be functional without the need for a continuous power/energy supply while the vehicle is in parked position.

The parking brake locking mechanism 230 is supplied with power on line 234 from an energy storage 240. The energy storage 240 may comprise any type of energy storage, such as a pneumatic energy storage, an electrical energy storage, or a hydraulic energy storage. Other types of energy storages are possible.

In response to receiving an activating signal on line 242 from the parking brake controller 202 to lock the parking brake, the parking brake locking mechanism 230 communicates via line 232 to the parking brake actuator 206 to maintain the clamping force of the drum brake components 224 applied to the wheel drum 222 to thereby maintain (i.e., lock) the vehicle in its parked position. The vehicle is unlocked from the parked position when the parking brake locking mechanism 230 receives a deactivating signal on line 242 from the parking brake controller 202 to unlock the parking brake. Operation of the parking brake locking mechanism 230 to lock and unlock the parking brake actuator 206 in response to a signal on line 242 from the parking brake controller 202 is conventional and, therefore, will not be described.

Figure 3:
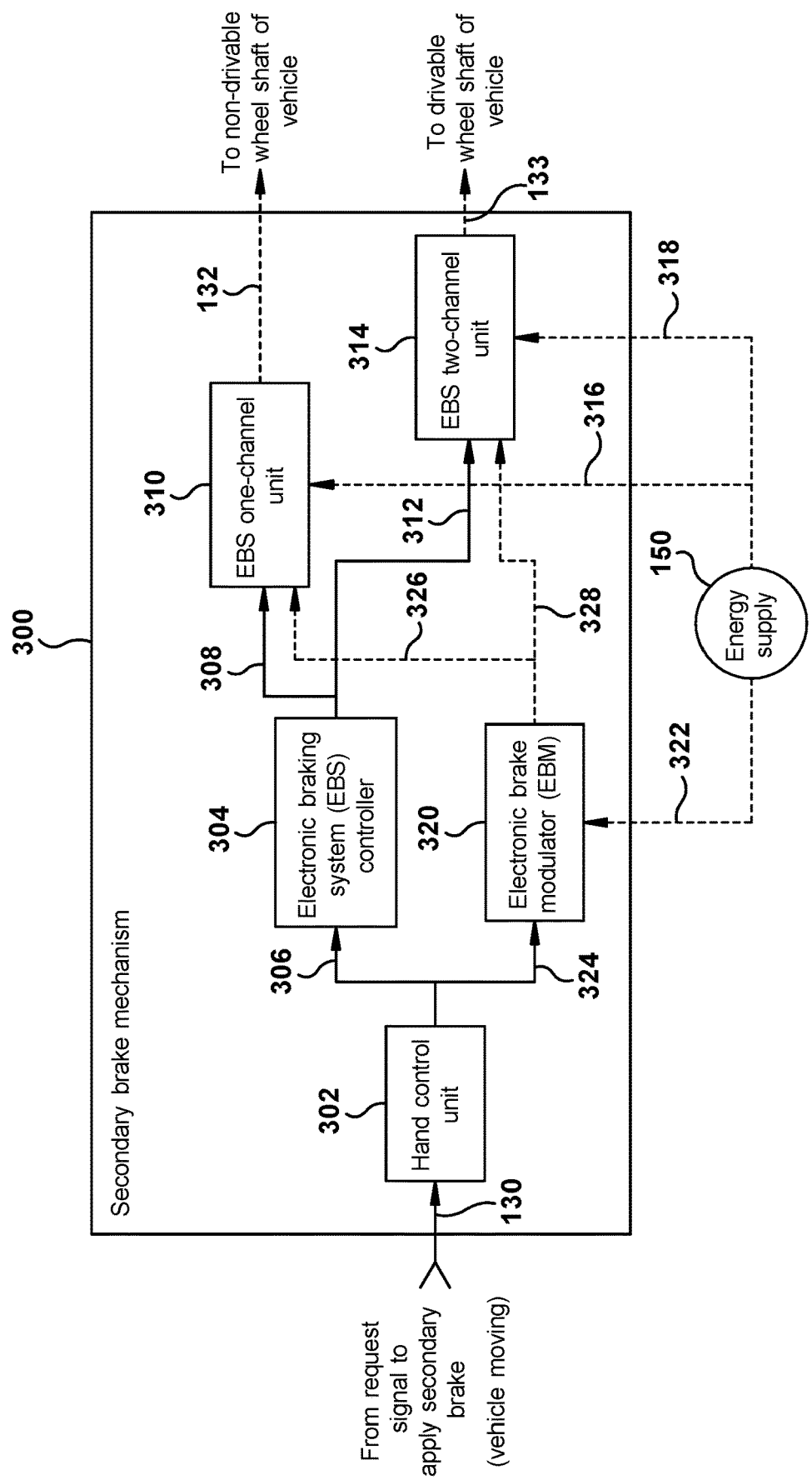
FIG. 3 is a schematic block diagram showing an embodiment of a secondary brake mechanism used in the parking brake apparatus of FIG. 1.

Referring to FIG. 3, a schematic block diagram showing an embodiment of the secondary brake mechanism 300 used in the parking brake apparatus 100 of FIG. 1 is illustrated. The activatable secondary brake mechanism 300 is provided for, when activated, providing the vehicle with secondary brake functionality when the vehicle is in motion and the service brakes 134 (FIG. 1) of the vehicle are unavailable to stop the vehicle. More specifically, the secondary brake mechanism 300 includes a hand control unit 302 that is responsive to the request signal on line 130 to apply the secondary brake when the vehicle is moving. The hand control unit 302 allows a vehicle driver to activate the service brakes 134 (FIG. 1) to provide a secondary brake functionality, which is to apply a braking force to at least one wheel shaft of the moving vehicle to reduce rotational speed of the wheel shaft till standstill (vehicle wheel does not lock) and thereby to stop the vehicle.

The secondary braking mechanism 300 also includes an electronic braking system (EBS) controller 304 that is electrically coupled via line 306 to the hand control unit 302. Electrical coupling between electrical components including the EBS controller 304 and the hand control unit 302 shown in FIG. 3 may be via a controller area network (CAN) or other electronic messaging system. The EBS controller 304 is responsive to a first brake request signal on line 306 from the hand control unit 302 to provide the vehicle with the secondary brake functionality. More specifically, the EBS controller 302 provides a signal on line 308 to an EBS one-channel unit 310 and a signal on line 312 to an EBS two-channel unit 314. The EBS one-channel unit 310 receives power on line 316 from the energy supply 150, and the EBS two-channel unit 314 receives power on line 318 from the energy supply 150.

The secondary braking mechanism 300 further includes an electronic brake module (EBM) 320 that is electrically coupled to the hand control unit 302. The EBM 320 receives power on line 322 from the energy supply 150. The EBM 320 is responsive to a second brake request signal on line 324 (which may be the same as the signal on line 306 as shown in FIG. 3) from the hand control unit 302 to provide the vehicle with the secondary brake functionality when the EBS controller 304 is unable to respond to the first brake request signal on line 306 from the hand control unit 302 to provide the vehicle with the secondary brake functionality. More specifically, the EBM 320 provides a signal on line 326 to the EBS one-channel unit 310 and a signal on line 328 to the EBS two-channel unit 314.

When the EBS one-channel unit 310 receives either a signal on line 308 from the EBS controller 304 or a signal on line 326 from the EBM 320, the EBS one-channel unit 310 provides a signal on line 132 (see also FIG. 1) to operate the service brakes 134 of the moving vehicle to stop the vehicle. Similarly, when the EBS two-channel unit 314 receives either a signal on line 312 from the EBS controller 304 or a signal on line 328 from the EBM 320, the EBS two-channel unit 314 provides a signal on line 133 (see also FIG. 1) to operate the service brakes 134 of the moving vehicle to stop the vehicle. Accordingly, the EBM 320 acts as a backup for the EBS controller 304 to provide the secondary brake functionality.

Figure 3A:
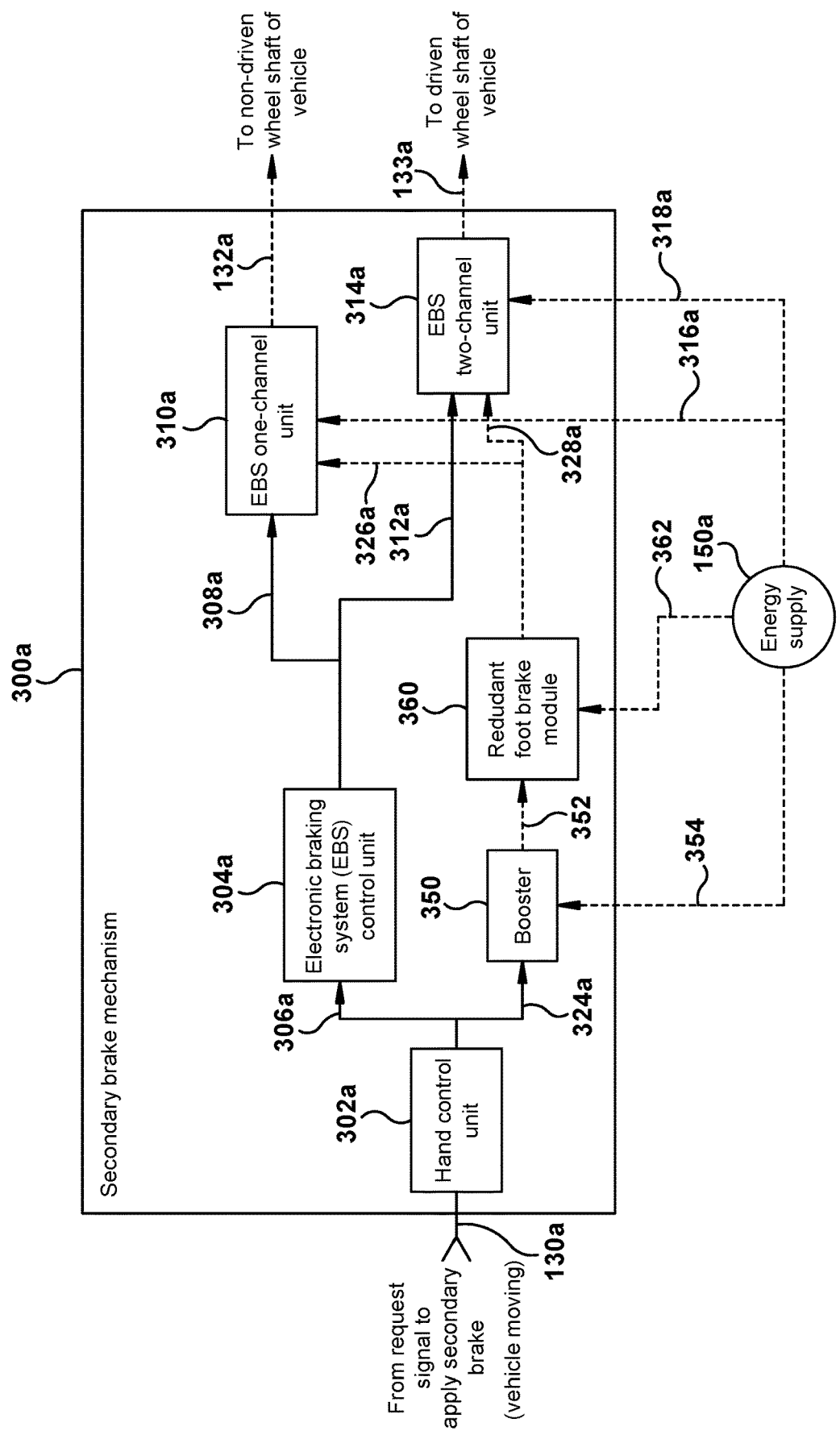
FIG. 3A is a schematic block diagram similar to FIG. 3 showing another embodiment of a secondary brake mechanism used in the parking brake apparatus of FIG. 1.

Referring to FIG. 3A, another embodiment of the secondary brake mechanism 300 used in the parking brake apparatus 100 of FIG. 1 is illustrated. Since the embodiment illustrated in FIG. 3A is generally similar to the embodiment illustrated in FIG. 3, similar numerals are utilized to designate similar components, the suffix letter "a" being associated with the embodiment of FIG. 3A to avoid confusion.

Activatable secondary brake mechanism 300a is provided for, when activated, providing the vehicle with a secondary brake functionality when the vehicle is in motion and the service brakes 134 (FIG. 1) of the vehicle are unavailable to stop the vehicle. More specifically, secondary brake mechanism 300a includes hand control unit 302a that is responsive to the request signal on line 130a to apply the secondary brake when the vehicle is moving. Hand control unit 302a allows a vehicle driver to activate the service brakes 134 (FIG. 1) to provide secondary brake functionality, which is to apply a braking force to a wheel shaft of the moving vehicle to reduce rotational speed of the wheel shaft till standstill (vehicle wheel does not lock) and thereby to stop the vehicle.

Secondary braking mechanism 300a also includes electronic braking system (EBS) controller 304a that is electrically coupled to hand control unit 302a. Electrical coupling between electrical components including EBS controller 304a and hand control unit 302a shown in FIG. 3A may be via a CAN or other electronic messaging system. EBS controller 304a is responsive to a first brake request signal on line 306a from hand control unit 302a to provide the vehicle with the secondary brake functionality. More specifically, EBS controller 304a provides a signal on line 308a to EBS one-channel unit 310a and a signal on line 312a to EBS two-channel unit 314a. EBS one-channel unit 310a receives power on line 316a from energy supply 150a, and the EBS two-channel unit 314a receives power on line 318a from energy supply 150a.

Secondary braking mechanism 300a further includes booster 350 that is coupled to hand control unit 302a, and redundant foot brake module (RFBM) 360 that is coupled via line 352 to booster 350. Booster 350 receives power on line 354 from energy supply 150a, and RFBM 360 receives power on line 362 from energy supply 150a. Booster 350 is responsive to a second brake request signal on line 324a (which may be the same as the signal on line 306a as shown in FIG. 3A) from hand control unit 302a to activate RFBM 360 to provide the vehicle with the secondary braking functionality when EBS controller 310a is unable to respond to the first brake request signal on line 306a from hand control unit 302a to provide the vehicle with the secondary brake functionality. More specifically, RFBM 360 provides a signal on line 326a to EBS one-channel unit 310a and a signal on line 328a to EBS two-channel unit 314a.

When EBS one-channel unit 310a receives either a signal on line 308a from EBS controller 304a or a signal on line 326a from RFBM 360, EBS one-channel unit 310a provides a signal on line 132a to operate the service brakes 134 (FIG. 1) of the moving vehicle to stop the vehicle. Similarly, when EBS two-channel unit 314a receives either a signal on line 312a from EBS controller 304a or a signal on line 328a from RFBM 360, EBS two-channel unit 314a provides a signal on line 133a to operate the service brakes 134 (FIG. 1) of the moving vehicle to stop the vehicle. Accordingly, the combination of booster 350 and RFBM 360 acts as a backup for EBS controller 304a to provide the secondary brake functionality.

Figure 4:
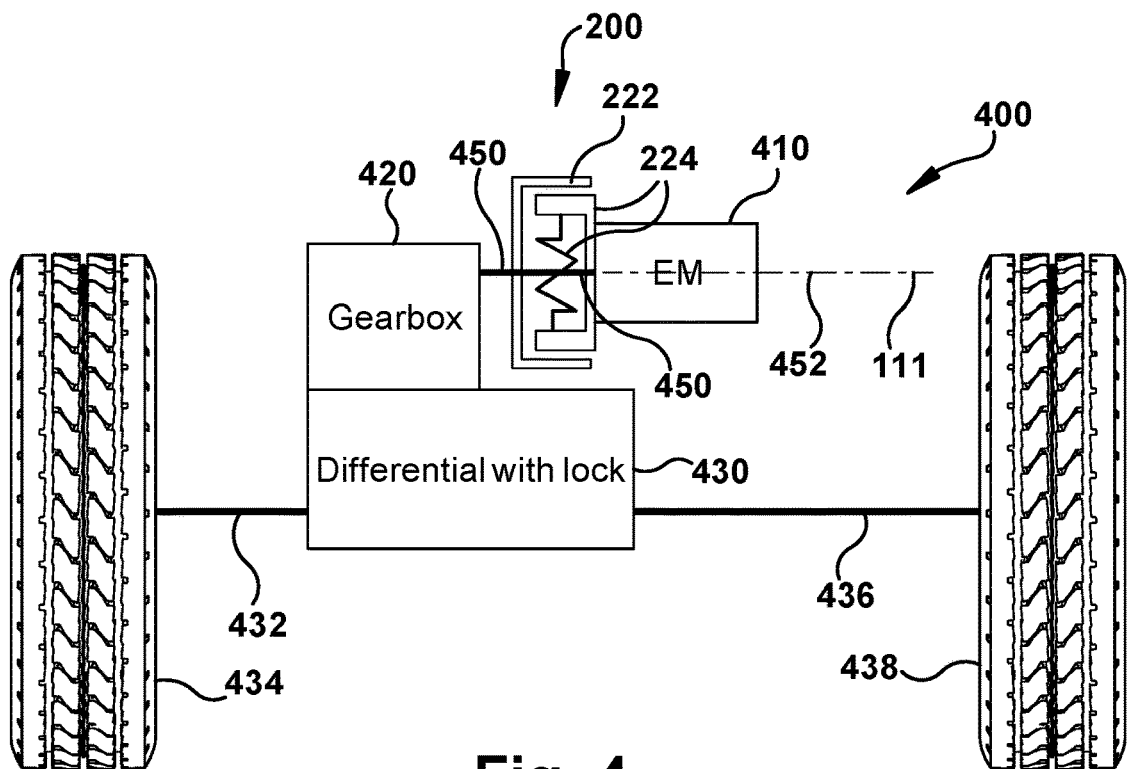
FIG. 4 is a schematic diagram of at least a portion of an example vehicle drive train embodying the parking brake apparatus of FIG. 1.

Referring to FIG. 4, a schematic diagram of at least a portion of an example vehicle drive train 400 embodying the parking brake apparatus 100 of FIG. 1 is illustrated. For simplicity and purpose of explanation, only the wheel drum 222 and the drum brake components 224 of the brake assembly 220 of the parking brake mechanism 200 (FIG. 2) of the parking brake apparatus 100 (FIG. 1) are shown in the vehicle drive train 400 of FIG. 4.

The wheel drum 222 is located along the vehicle drive train 400 between a vehicle propulsion engine 410, which may be in the form of an electric motor EM as shown, and a gearbox 420 of a vehicle transmission. The gearbox 420 includes one or more stages of gears drivingly coupled in known manner to a differential with lock 430 (referred to herein as "the differential 430"). The differential 430 is drivingly coupled between an end of a first wheel half-shaft 432 and an end of a second wheel half-shaft 436. A first vehicle wheel 434 is mounted at the opposite end of the first wheel half-shaft 432, and a second vehicle wheel 438 is mounted at the opposite end of the second wheel half-shaft 436.

The differential 430 distributes torque that is delivered from the vehicle propulsion engine 410 and modified through the gearbox 420 to the first and second wheel half-shafts 432, 436 depending upon the driving situation of the vehicle. Structure and operation of the gearbox 420 and the differential 430 with its locking function to equally distribute torque from the vehicle propulsion engine 410 to the vehicle wheels 434, 438 are conventional and, therefore, will not be described.

As shown in the embodiment of FIG. 4, the wheel drum 222 is fixedly attached to a rotor shaft 450 of the vehicle propulsion engine 410. The rotor shaft 450 is drivingly coupled in known manner to the one or more gears of gearbox 420. The wheel drum 222 has a longitudinal central axis 452 (shown only in FIG. 4) that is coaxial with the longitudinal central axis 111 (also shown in FIG. 2) of the rotor shaft 450 of the vehicle propulsion engine 410. Although the wheel drum 222 shown in FIG. 4 as being located outside of the gearbox 420, it is conceivable that the wheel drum 222 be located within the gearbox 420 and fixedly attached to a drivetrain shaft within the gearbox 420.

The activatable drum brake components 224 are provided for, when activated, applying a clamping force to the wheel drum 222 to prevent both the wheel drum 222 and the rotor shaft 450 fixedly attached thereto from rotating to thereby park the vehicle. When the drum brake components 224 are activated to apply the clamping force to the wheel drum 222, the locking function of the differential 430 is also activated. The parking brake function and the differential locking function can be activated with a common actuator. A clutch can be used within the actuator to ensure that the differential locking function can be activated without activating the parking brake function.

The clamping force applied to the wheel drum 222 is based upon a gear-ratio relationship between the vehicle propulsion engine 410 and each of the vehicle wheels 434, 438. The gear-ratio relationship changes the required clamping force proportionally and is sufficient to maintain the vehicle in a parked position. The activatable locking mechanism 230 (FIG. 2), when activated, maintains the clamping force of the drum brake components 224 applied to the wheel drum 222 to maintain the vehicle in the parked position until the locking mechanism is deactivated.

Figure 4A:
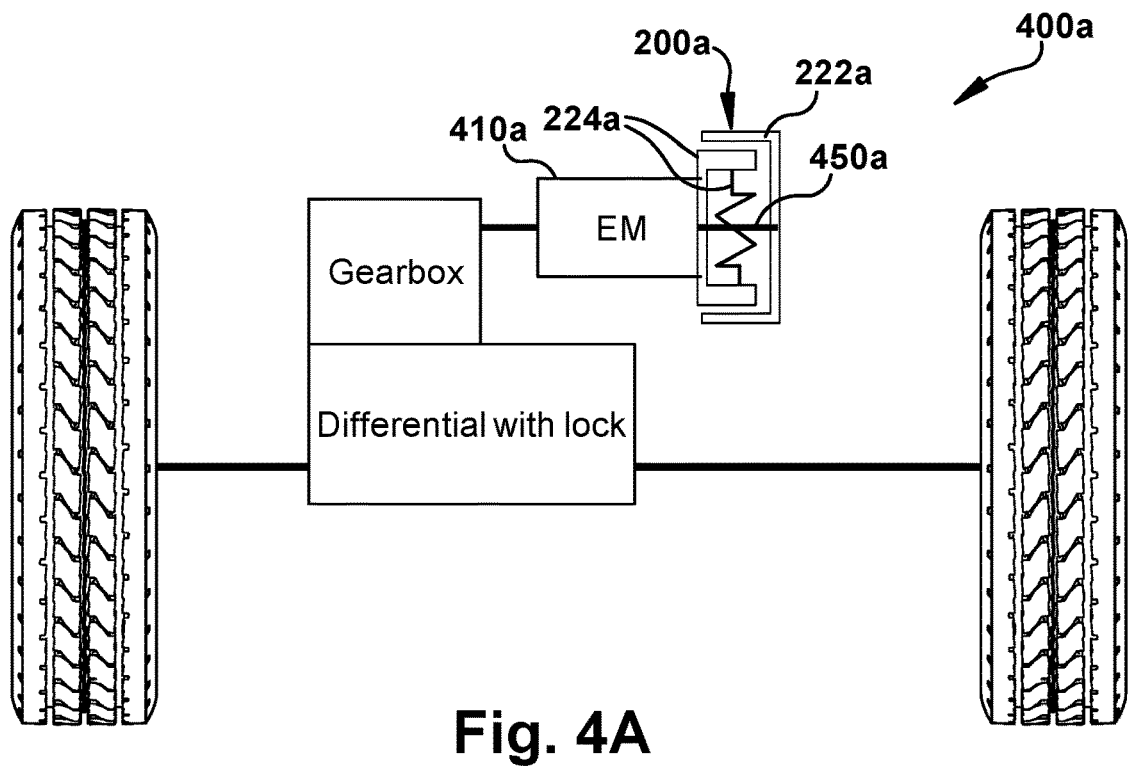
FIG. 4A is a schematic diagram of at least a portion of another example vehicle drive train embodying the parking brake apparatus of FIG. 1.

Referring to FIG. 4A, a schematic diagram of at least a portion of another example vehicle drive train 400a embodying the parking brake apparatus 100 of FIG. 1 is illustrated. Since the embodiment illustrated in FIG. 4A is generally similar to the embodiment illustrated in FIG. 4, similar numerals are utilized to designate similar components, the suffix letter "a" being associated with the embodiment of FIG. 4A to avoid confusion.

As shown in FIG. 4A, wheel drum 222a of drum brake assembly 200a is fixedly attached at a location of rotor shaft 450a, which location is on opposite end of the vehicle propulsion engine 410a and away from gearbox 420a. Drum brake components 224a apply a clamping force to wheel drum 222a to prevent rotation of rotor shaft 450a in the same manner as described hereinabove for the embodiment of FIG. 4.

Figure 4B:
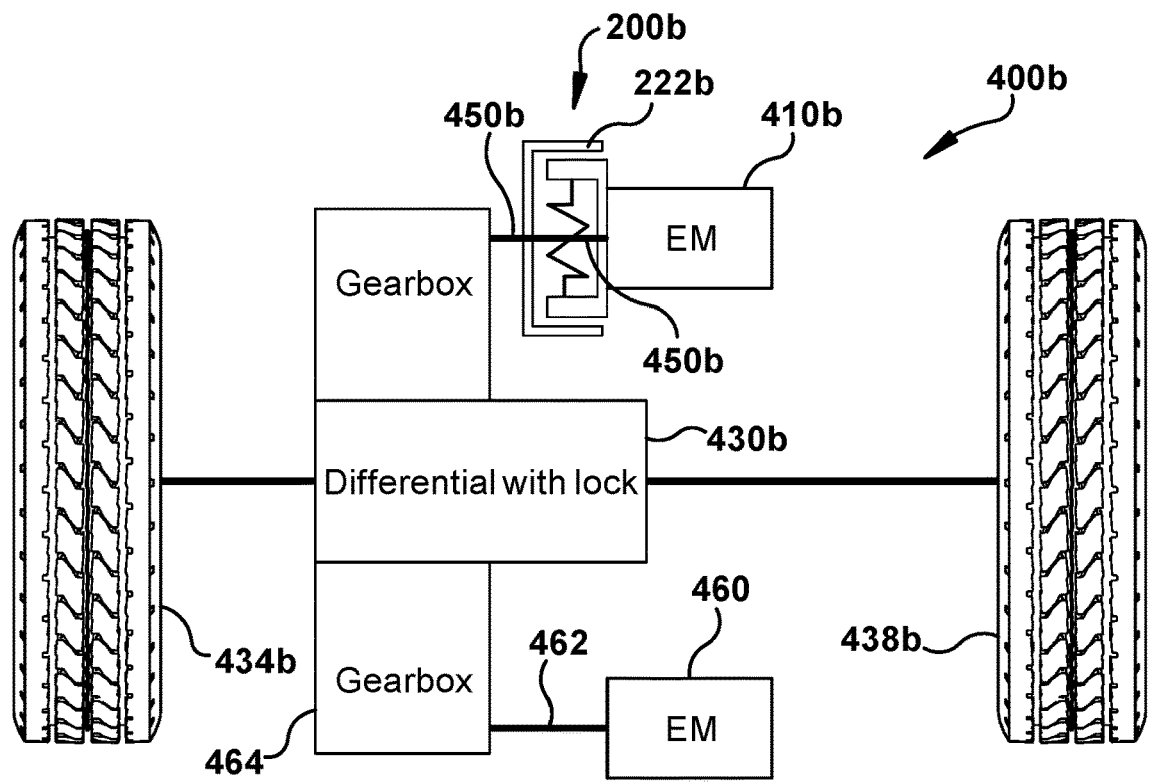
FIG. 4B is a schematic diagram of at least a portion of another example vehicle drive train embodying the parking brake apparatus of FIG. 1.

Referring to FIG. 4B, a schematic diagram of at least a portion of another example vehicle drive train 400b embodying the parking brake apparatus 100 of FIG. 1 is illustrated. Since the embodiment illustrated in FIG. 4B is generally similar to the embodiment illustrated in FIG. 4, similar numerals are utilized to designate similar components, the suffix letter "b" being associated with the embodiment of FIG. 4B to avoid confusion.

As shown in FIG. 4B, a second vehicle propulsion engine 460 (i.e., a twin-drive vehicle) is drivingly coupled through rotor shaft 462 to another gearbox 464 to provide additional torque through differential 430a to wheels 434b, 438b. Drum brake components 224b of drum brake assembly 200b apply a clamping force to wheel drum 222a to prevent rotation of rotor shaft 450b of vehicle propulsion engine 410b in the same manner as described hereinabove for the embodiment of FIG. 4. Since differential 430a has a locking function, only the one drum brake assembly 200b shown in FIG. 4B is needed.

Figure 4C:
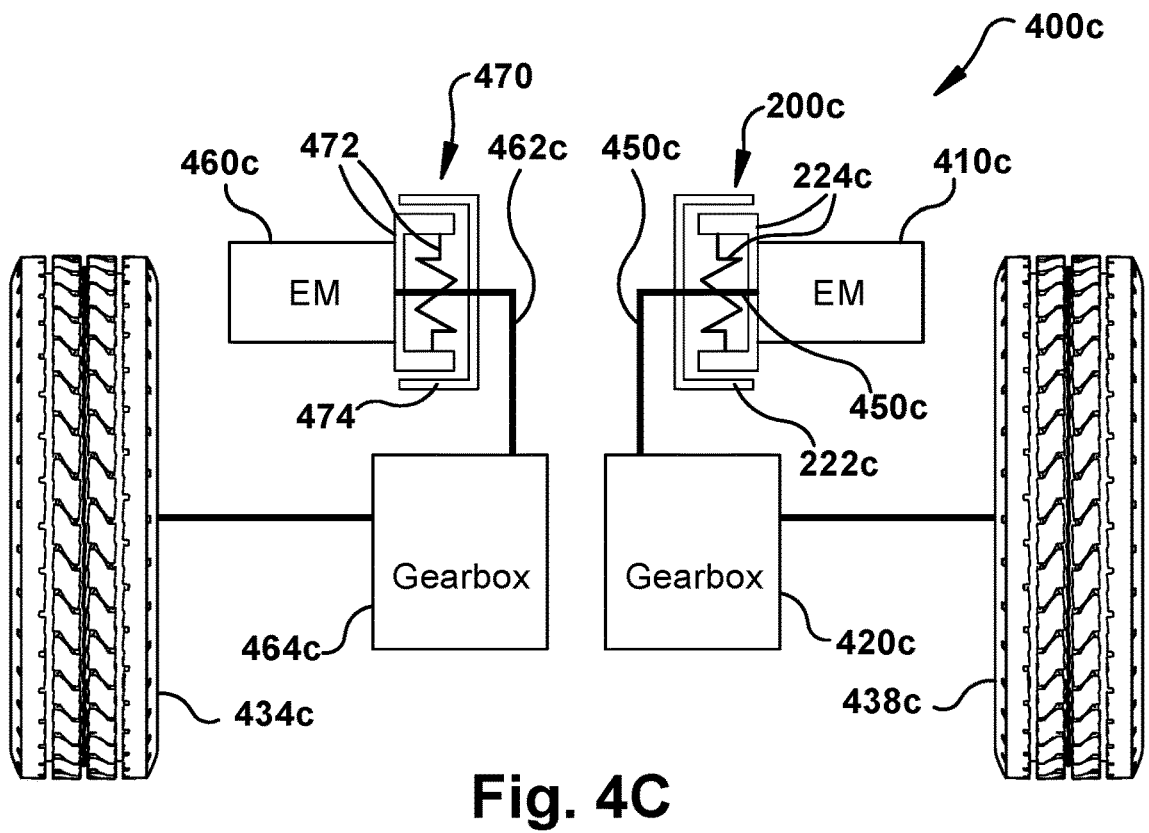
FIG. 4C is a schematic diagram of at least a portion of another example vehicle drive train embodying the parking brake apparatus of FIG. 1.

Referring to FIG. 4C, a schematic diagram of at least a portion of another example vehicle drive train 400c embodying the parking brake apparatus 100 of FIG. 1 is illustrated. Since the embodiment illustrated in FIG. 4C is generally similar to the embodiment illustrated in FIG. 4, similar numerals are utilized to designate similar components, the suffix letter "c" being associated with the embodiment of FIG. 4C to avoid confusion.

As shown in FIG. 4C, rotor shaft 450c of vehicle propulsion engine 410c is drivingly coupled through gearbox 420c to provide torque to wheel 438c, and rotor shaft 462c of vehicle propulsion engine 460c is drivingly coupled through gearbox 464c to provide torque to wheel 434c. Drum brake components 224c of drum brake assembly 200c apply a clamping force to wheel drum 222c to prevent rotation of rotor shaft 450c of vehicle propulsion engine 410c in the same manner as described hereinabove for the embodiment of FIG. 4. Similarly, drum brake components 472 of drum brake assembly 470 apply a clamping force to wheel drum 474 to prevent rotation of rotor shaft 462c of vehicle propulsion engine 460c. Drum brake components 224c and drum brake components 472 can be activated by a common actuator or by individual actuators.

Figure 4D:
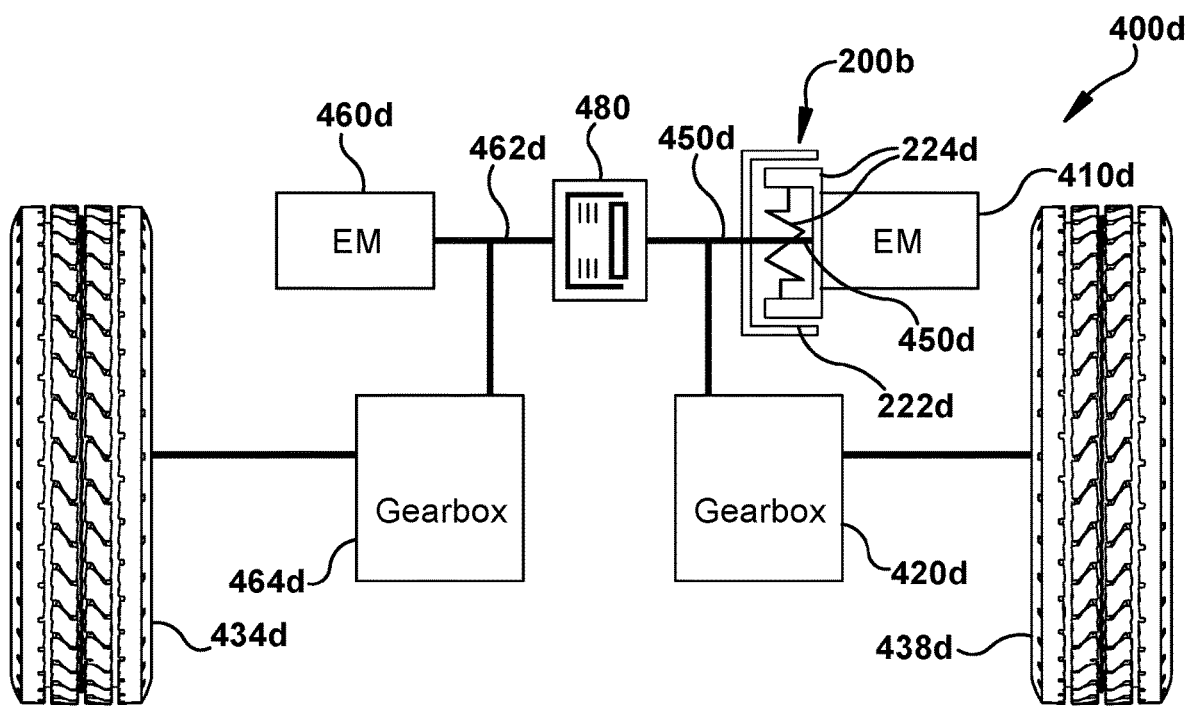
FIG. 4D is a schematic diagram of at least a portion of another example vehicle drive train embodying the parking brake apparatus of FIG. 1.

Referring to FIG. 4D, a schematic diagram of at least a portion of another example vehicle drive train 400d embodying the parking brake apparatus 100 of FIG. 1 is illustrated. Since the embodiment illustrated in FIG. 4d is generally similar to the embodiment illustrated in FIG. 4, similar numerals are utilized to designate similar components, the suffix letter "d" being associated with the embodiment of FIG. 4D to avoid confusion.

As shown in FIG. 4D, rotor shaft 450d of vehicle propulsion engine 410d is drivingly coupled through gearbox 420d to provide torque to wheel 438d, and rotor shaft 462d of vehicle propulsion engine 460d is drivingly coupled through gearbox 464d to provide torque to wheel 434d. Activatable shaft lock 480 interconnects rotor shaft 450d and rotor shaft 462d and, when activated, locks the rotor shafts for rotation together as a unit. Drum brake components 224d of drum brake assembly 200d apply a clamping force to wheel drum 222d to prevent rotation of rotor shaft 450d of vehicle propulsion engine 410d in the same manner as described hereinabove for the embodiment of FIG. 4. Drum brake components 224d and shaft lock 480 can be activated by a common actuator or by individual actuators.

In the embodiment of FIG. 4D, it is possible to provide driving with limited driving functionality in the event that either vehicle propulsion engine 410d or vehicle propulsion engine 460d fails. Driving with limited functionality is possible when the rotor shaft 450d and the rotor shaft 462d are interconnected (i.e., when the shaft lock 480 is activated).

Figure 4E:
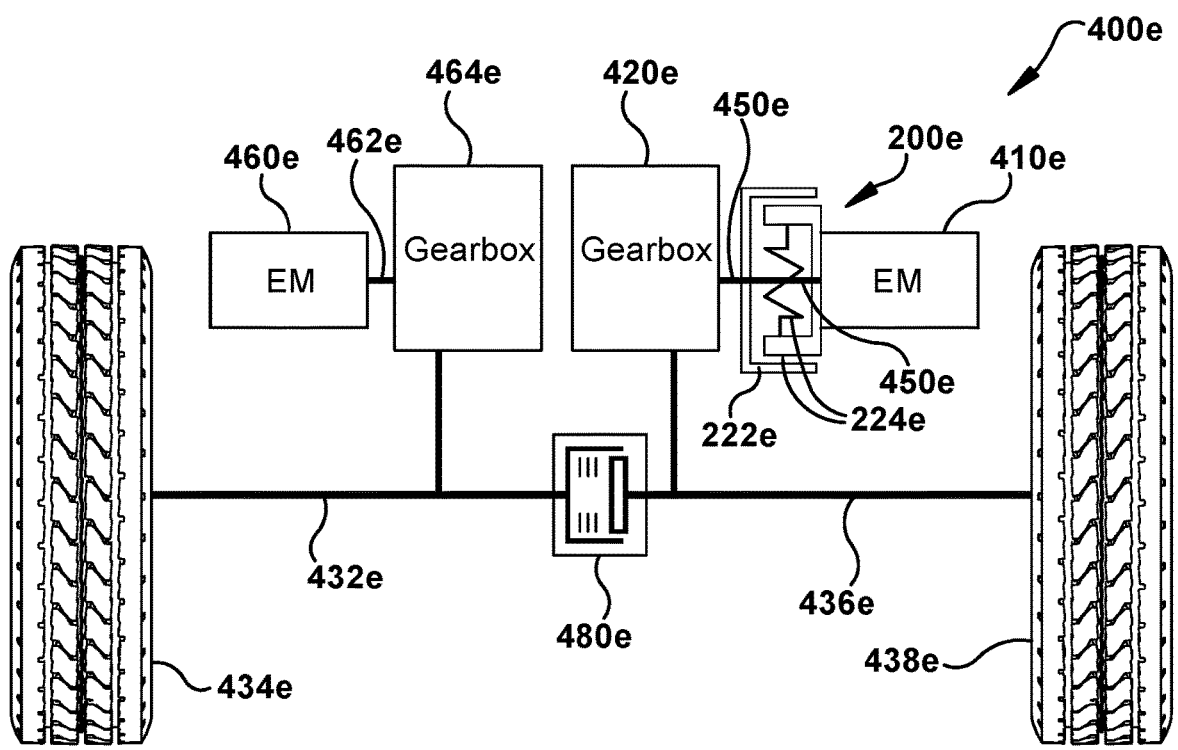
FIG. 4E is a schematic diagram of at least a portion of another example vehicle drive train embodying the parking brake apparatus of FIG. 1.

Referring to FIG. 4E, a schematic diagram of at least a portion of another example vehicle drive train 400e embodying the parking brake apparatus 100 of FIG. 1 is illustrated. Since the embodiment illustrated in FIG. 4e is generally similar to the embodiment illustrated in FIG. 4, similar numerals are utilized to designate similar components, the suffix letter "e" being associated with the embodiment of FIG. 4E to avoid confusion.

As shown in FIG. 4E, rotor shaft 450e of vehicle propulsion engine 410e is drivingly coupled through gearbox 420e to provide torque to wheel 438e, and rotor shaft 462e of vehicle propulsion engine 460e is drivingly coupled through gearbox 464e to provide torque to wheel 434e. Activatable shaft lock 480e interconnects wheel half-shaft 432e and wheel half-shaft 436e and, when activated, locks the wheel half-shafts for rotation together as a unit. Drum brake components 224e of drum brake assembly 200e apply a clamping force to wheel drum 222e to prevent rotation of rotor shaft 450e of vehicle propulsion engine 410e in the same manner as described hereinabove for the embodiment of FIG. 4. Drum brake components 224e and shaft lock 480e can be activated by a common actuator or by individual actuators.

Figure 4F:
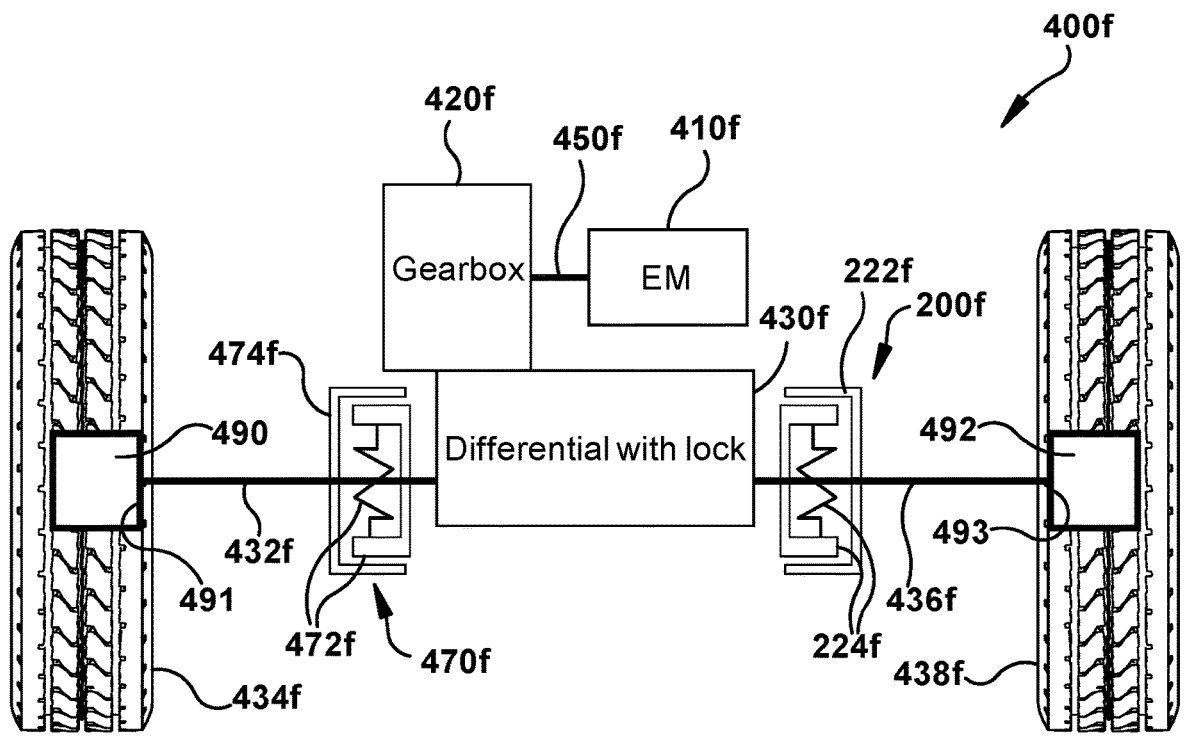
FIG. 4F is a schematic diagram of at least a portion of another example vehicle drive train embodying the parking brake apparatus of FIG. 1.

Referring to FIG. 4F, a schematic diagram of at least a portion of another example vehicle drive train 400f embodying the parking brake apparatus 100 of FIG. 1 is illustrated. Since the embodiment illustrated in FIG. 4F is generally similar to the embodiment illustrated in FIG. 4, similar numerals are utilized to designate similar components, the suffix letter "f" being associated with the embodiment of FIG. 4F to avoid confusion.

As shown in FIG. 4F, rotor shaft 450f of vehicle propulsion engine 410f is drivingly coupled through gearbox 420f and differential 430f to provide torque to wheel 438f. Gearbox 420f includes one or more stages of gears drivingly coupled in known manner to differential 430f that is drivingly coupled between one end of wheel half-shaft 432f and one end of wheel half-shaft 436f. Wheel drum 222f is fixedly attached to a portion of wheel half-shaft 436f and located outside of wheel hub 493 of vehicle wheel 438f, and wheel drum 474f is fixedly attached to a portion of wheel half-shaft 432f and located outside of wheel hub 491 of vehicle wheel 434f. Wheel drum 222f is spaced apart from vehicle wheel 438f along wheel half-shaft 436f. Wheel drum 474f is spaced apart from vehicle wheel 434f along wheel half-shaft 432f.

Gearbox 490 is located at opposite end of wheel half-shaft 432f and in vicinity of wheel hub 491 of vehicle wheel 434f. Gearbox 490 may be integrated in wheel hub 491, downstream of wheel hub 491, or upstream of wheel hub 491. Similarly, gearbox 492 is located at opposite end of wheel half-shaft 436f and in vicinity of wheel hub 493 of vehicle wheel 438f. Gearbox 492 may be integrated in wheel hub 493, downstream of wheel hub 493, or upstream of wheel hub 493.

Drum brake components 224f of drum brake assembly 200f apply a clamping force to wheel drum 222f to prevent rotation of wheel drum 222f and wheel half-shaft 436f. Similarly, drum brake components 472f of drum brake assembly 470f apply a clamping force to wheel drum 474f to prevent rotation of wheel drum 474f and wheel half-shaft 432f. Since two drum brake assemblies (i.e., drum brake assembly 200f and drum brake assembly 472f) are being used, activation of the parking brake function is independent of the differential locking function. In this case, clamping forces are distributed between two drum brake assemblies. However, if only one drum brake assembly were to be used, the differential locking function would need to be activated when the parking brake function is activated.

Figure 4G:
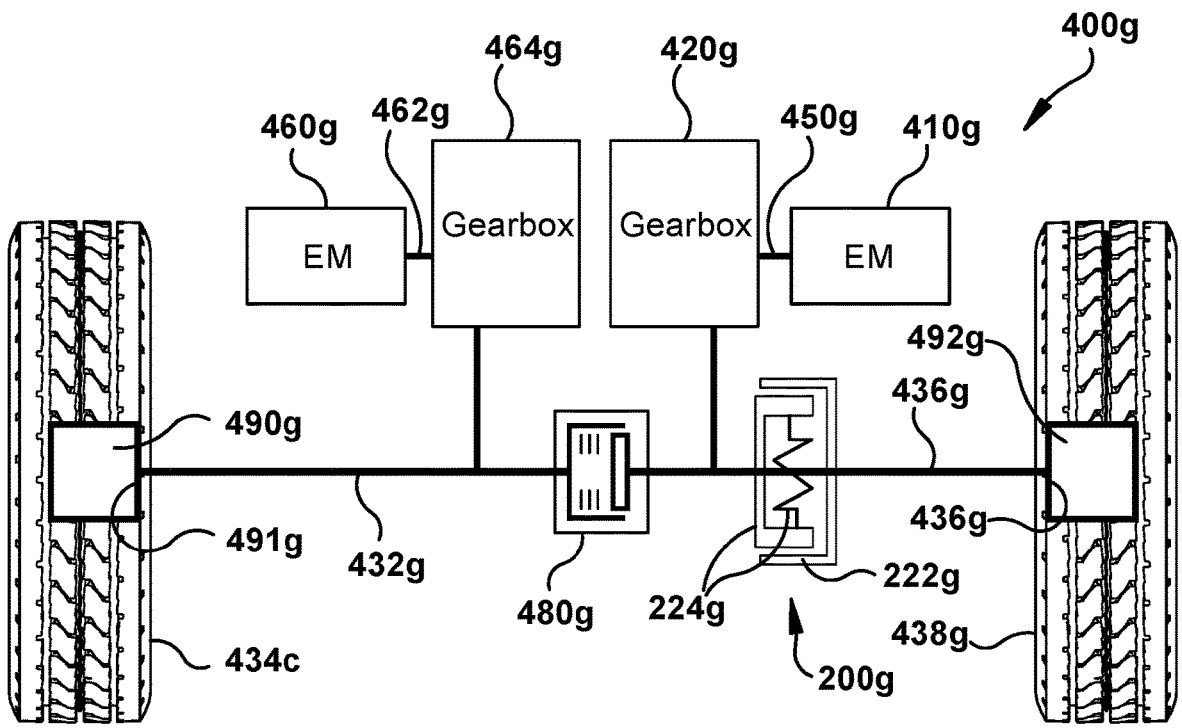
FIG. 4G is a schematic diagram of at least a portion of another example vehicle drive train embodying the parking brake apparatus of FIG. 1.

Referring to FIG. 4G, a schematic diagram of at least a portion of another example vehicle drive train 400g embodying the parking brake apparatus 100 of FIG. 1 is illustrated. Since the embodiment illustrated in FIG. 4G is generally similar to the embodiment illustrated in FIG. 4, similar numerals are utilized to designate similar components, the suffix letter "g" being associated with the embodiment of FIG. 4G to avoid confusion.

As shown in FIG. 4G, rotor shaft 450g of vehicle propulsion engine 410g is drivingly coupled through gearbox 420g to provide torque to wheel 438g, and rotor shaft 462g of vehicle propulsion engine 460g is drivingly coupled through gearbox 464g to provide torque to wheel 434g. Activatable shaft lock 480g interconnects one end of wheel half-shaft 432g and one end of wheel half-shaft 436g and, when activated, locks the wheel half-shafts for rotation together as a unit.

Gearbox 490g is located at opposite end of wheel half-shaft 432g and in vicinity of wheel hub 491g of vehicle wheel 434g. Gearbox 490g may be integrated in wheel hub 491g, downstream of wheel hub 491g, or upstream of wheel hub 491g. Similarly, gearbox 492g is located at opposite end of wheel half-shaft 436g and in vicinity of wheel hub 493g of vehicle wheel 438g. Gearbox 492g may be integrated in wheel hub 493g, downstream of wheel hub 493g, or upstream of wheel hub 493g.

Wheel drum 222g is fixedly attached to a portion of wheel half-shaft 436g and is located outside of wheel hub 493g of vehicle wheel 438g. Wheel drum 222g is spaced apart from vehicle wheel 438g along wheel half-shaft 436g. Drum brake components 224g of drum brake assembly 200g apply a clamping force to wheel drum 222g to prevent rotation of wheel drum 222g and wheel half-shaft 436g.

Figure 4H:
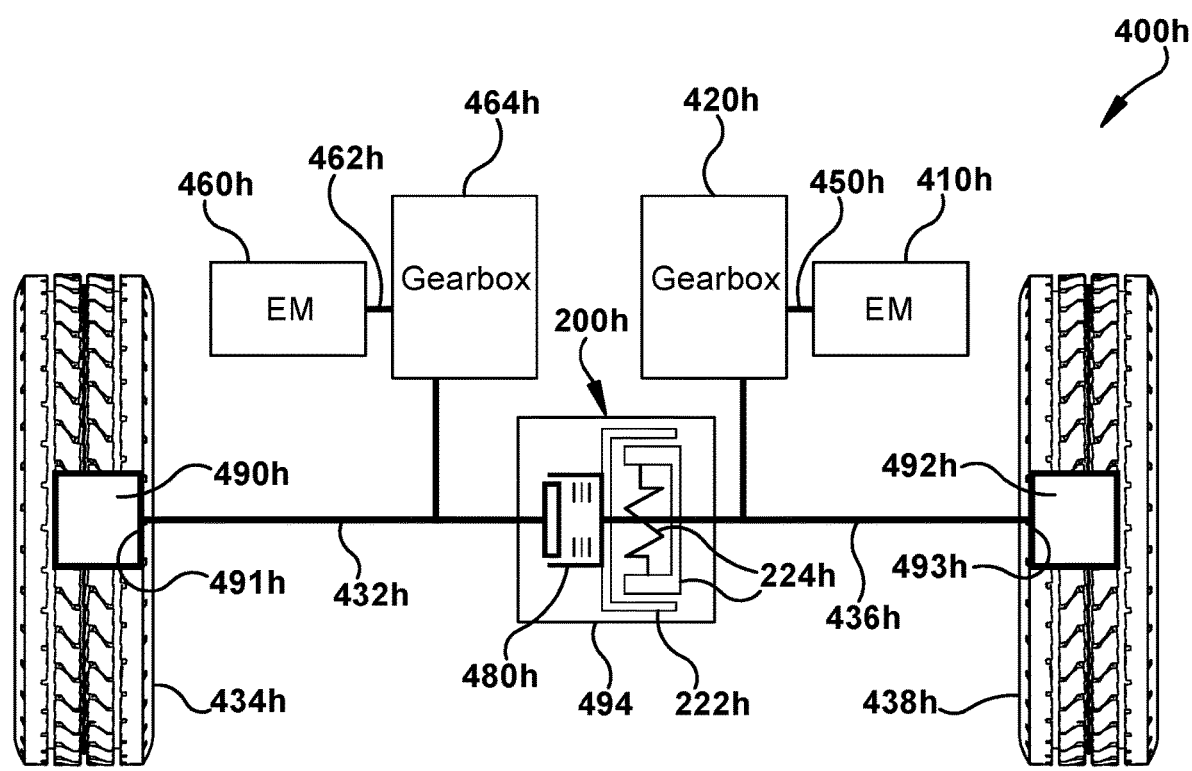
FIG. 4H is a schematic diagram of at least a portion of another example vehicle drive train embodying the parking brake apparatus of FIG. 1.

Referring to FIG. 4H, a schematic diagram of at least a portion of another example vehicle drive train 400h embodying the parking brake apparatus 100 of FIG. 1 is illustrated. Since the embodiment illustrated in FIG. 4H is generally similar to the embodiment illustrated in FIG. 4, similar numerals are utilized to designate similar components, the suffix letter "h" being associated with the embodiment of FIG. 4H to avoid confusion.

As shown in FIG. 4H, rotor shaft 450*h* of vehicle propulsion engine 410*h* is drivingly coupled through gearbox 420*h* to provide torque to wheel 438*h*, and rotor shaft 462*h* of vehicle propulsion engine 460*h* is drivingly coupled through gearbox 464*h* to provide torque to wheel 434*h*. Activatable shaft lock 480*h* interconnects one end of wheel half-shaft 432*h* and one end of wheel half-shaft 436*h* and, when activated, locks the wheel half-shafts for rotation together as a unit.

Gearbox 490*h* is located at opposite end of wheel half-shaft 432*h* and in vicinity of wheel hub 491*h* of vehicle wheel 434*h*. Gearbox 490*h* may be integrated in wheel hub 491*h*, downstream of wheel hub 491*h*, or upstream of wheel hub 491*h*. Similarly, gearbox 492*h* is located at opposite end of wheel half-shaft 436*h* and in vicinity of wheel hub 493*h* of vehicle wheel 438*h*. Gearbox 492*h* may be integrated in wheel hub 493*h*, downstream of wheel hub 493*h*, or upstream of wheel hub 493*h*.

Shaft lock 480*h* and drum brake assembly 200*h* including wheel drum 222*g* and drum brake components 224*g* are enclosed in common housing 494. Drum brake components 224*h* apply a clamping force to wheel drum 222*h* to prevent rotation of wheel drum 222*h* and wheel half-shaft 436*h*.

It should be apparent that the above description describes a parking brake function that is provided by a brake assembly, such as the drum brake assembly described herein. When activated, the drum brake components of the drum brake assembly prevent the wheels at both ends of at least one driven axle from rotating to provide the vehicle with the parking brake function. The drum brake assembly can be placed anywhere along the vehicle drive train, such as between the vehicle propulsion engine and the differential. The drum brake assembly can also be placed at other locations along the vehicle drive train, such as behind the vehicle propulsion engine, inside the vehicle propulsion engine, inside the gearbox of the vehicle transmission, or along the wheel half-shaft portion that is away from the wheel hub portion of the vehicle wheel. Moreover, it is conceivable that the drum brake assembly may be located on either end of the vehicle propulsion engine (i.e., the one or more blocks "EM" shown in each of FIGS. 4 and 4A-4H).

It is also conceivable that redundant configurations are possible when desired. For example, as shown in FIG. 4B, a redundant drum brake assembly may be included with the second vehicle propulsion engine 460 to provide a redundant parking brake functionality if desired. The redundant drum brake assembly would include a redundant wheel drum fixedly attached to a drivetrain shaft, and activatable drum brake components disposed in an interior chamber of the redundant wheel drum. When activated, the drum brake components would apply a clamping force to the redundant wheel drum to prevent the redundant wheel drum and the drivetrain shaft fixedly attached thereto from rotating and thereby to provide the vehicle with a redundant parking brake functionality.

It should also be apparent that the locking function of the parking brake mechanism is mechanical, the locking function of the differential is mechanical, and the locking function of the shaft lock is also mechanical. As such, these locking functions remain operational and maintained even when power/energy is off.

Figure 5:
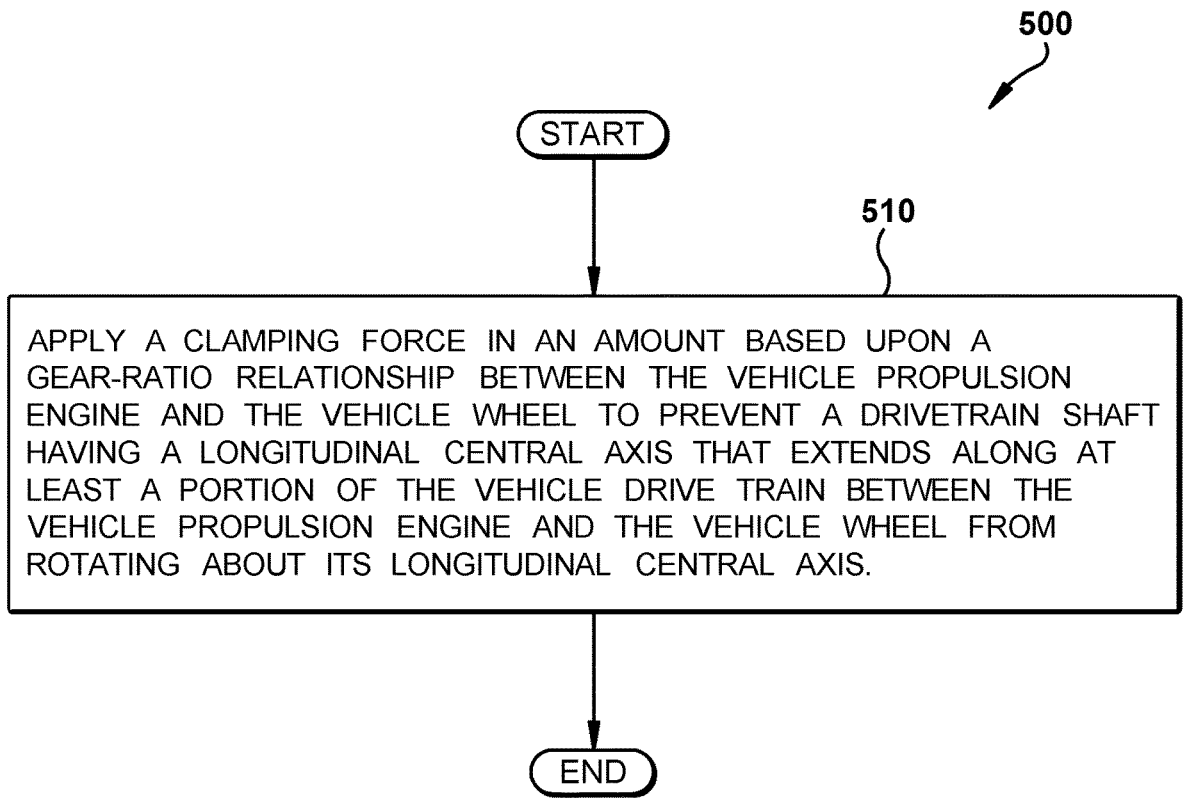
FIG. 5 is a flow diagram depicting a method of operating the parking brake apparatus of FIG. 1 in accordance with an embodiment.

Referring to FIG. 5, a flow diagram 500 depicting a method of operating the parking brake apparatus 100 of FIG. 1 in accordance with an embodiment is illustrated. The method provides a vehicle with a parking brake function. The vehicle has a vehicle drive train that extends between a vehicle propulsion engine and a vehicle wheel.

In block 510, a clamping force is applied in an amount based upon a gear-ratio relationship between the vehicle propulsion engine and the vehicle wheel to prevent a drivetrain shaft having a longitudinal central axis that extends along at least a portion of the vehicle drive train between the vehicle propulsion engine and the vehicle wheel from rotating about its longitudinal central axis. The vehicle is thereby parked.

In some embodiments, the clamping force is applied to a wheel drum that is fixedly attached to a rotor shaft of the vehicle propulsion engine, such that a holding torque at the vehicle wheel is proportional to a gear-ratio of the vehicle drive train.

In some embodiments, the clamping force is applied to a wheel drum that is fixedly attached to a wheel shaft portion that is away from a wheel hub portion of a vehicle wheel.

In some embodiments, a redundant clamping force is applied to a redundant wheel drum that is fixedly attached to a wheel shaft portion that is outside of a wheel hub portion of a vehicle wheel.

A number of advantages result by providing a vehicle with the above-described parking brake apparatus 100 of FIG. 1 or parking brake apparatus of one of the other embodiments to provide parking brake functionality. One advantage is that the parking brake actuator is moved away from the wheel hub of the vehicle wheel. This not only simplifies the overall brake system of the vehicle, but also reduces the size of wheel end components. Accordingly, overall cost of materials is reduced. Moreover, the vehicle brake system would be easier to assemble along a manufacturing line. The result is labor-cost savings as well as material-cost savings.

Another advantage is that the disclosed parking brake apparatus provides a mechanical advantage. Clamping forces needed to provide the parking brake function are reduced when parking brake components are moved away from the wheel hub of the vehicle wheel and are assembled to a drivetrain shaft that is rotating at a higher speed than the vehicle wheel. When clamping forces of the parking brake components are reduced, the actuating forces required for actuators to activate brake components are also reduced. Accordingly, the parking brake apparatus including the parking brake mechanism of the present disclosure provides a mechanical advantage as compared to known parking brake mechanisms which are located in wheel hubs of vehicle wheels.

The combination of the simplification of the overall brake system, the reduction of the size of parking brake components, and the reduction of activating forces needed to activate the smaller-sized brake components results in a gain of space within the vehicle. This gained space within the vehicle is especially advantageous for electric-driven vehicles where additional space for vehicle batteries is desirable.

Although the above description describes the request signal on line 102 (FIG. 1) to apply the parking brake and the request signal on line 130 to apply the secondary brake are provided by the vehicle driver, it is conceivable that one or both of the request signals be provided by one or more vehicle controllers. As an example, one or both of the request signals may be provided by one or more vehicle controllers when the vehicle is an autonomously driven (i.e., self-driving) or semi-autonomously driven type of vehicle.

Program instructions for enabling the parking brake controller 202 (FIG. 2) to perform operation steps in accordance with corresponding flow diagram 500 (FIG. 5) may be embedded in memory internal to the parking brake controller 202. Alternatively, or in addition to, program instructions may be stored in memory external to the parking brake controller 202. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one parking brake controller, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking brake apparatus for a vehicle including a vehicle drive train that extends between a vehicle propulsion engine and a vehicle wheel, the parking brake apparatus comprising:
   a wheel drum located away from the vehicle wheel and fixedly attached to a drivetrain shaft that extends along a portion of the vehicle drive train between the vehicle propulsion engine and the vehicle wheel;
   activatable drum brake components disposed in an interior chamber of the wheel drum and for, when activated, applying a clamping force to the wheel drum to prevent the wheel drum and the drivetrain shaft fixedly attached thereto from rotating and thereby preventing the vehicle wheel from rotating to provide the vehicle with a parking brake functionality; and
   an activatable shaft lock for, when activated, locking drivetrain shafts along the vehicle drive train together as a unit, wherein the shaft lock and the wheel drum are enclosed in a common housing.

2. The parking brake apparatus according to claim 1, wherein the wheel drum is located along the vehicle drive train between the vehicle propulsion engine and a vehicle differential.

3. The parking brake apparatus according to claim 2, wherein the wheel drum is fixedly attached to a rotor shaft of the vehicle propulsion engine.

4. The parking brake apparatus according to claim 1, wherein when the drum brake components are activated, the clamping force applied to the wheel drum is based upon a gear-ratio relationship between the vehicle propulsion engine and the vehicle wheel.

5. The parking brake apparatus according to claim 1, wherein the activatable shaft lock, when activated, maintains the clamping force of the drum brake components applied to the wheel drum to maintain the vehicle in the parked position until the shaft lock is deactivated.

6. The parking brake apparatus according to claim 1, wherein the wheel drum and the drum brake components disposed within the interior chamber of the wheel drum comprise an S-cam type of drum brake assembly.

7. The parking brake apparatus according to claim 1, wherein (i) the wheel drum is fixedly attached to a wheel shaft of the vehicle and is located outside of a wheel hub of the vehicle wheel, and (ii) the wheel drum is spaced apart from the wheel hub of the vehicle wheel along the wheel shaft.

8. The parking brake apparatus according to claim 1, wherein
   the activatable shaft lock, when activated, provides the vehicle with a secondary brake functionality when the vehicle is in motion and service brakes of the vehicle are unavailable to stop the vehicle.

9. A parking brake apparatus for a vehicle including a wheel shaft, a drivetrain shaft having a portion which is other than an end portion of the wheel shaft on which a vehicle wheel is mounted, and a service brake for applying a braking force to the wheel shaft to reduce rotational speed of the vehicle wheel when the vehicle is in motion, the parking brake apparatus comprising:
   a parking brake mechanism for, when the vehicle is stationary, activating a drum brake assembly to apply a clamping force to wheel drum that is fixedly attached to the drivetrain shaft portion to prevent rotation of the wheel drum and the drivetrain shaft, and thereby to provide the vehicle with a parking brake functionality;
   a secondary brake mechanism for, when the vehicle is in motion, activating the service brake to apply a braking force to the wheel shaft to reduce rotational speed of the vehicle wheel, and thereby to provide the vehicle with a secondary brake functionality; and
   a hand control unit for allowing a vehicle driver to activate the service brake to apply a braking force to the wheel shaft to reduce rotational speed of the wheel;
   an electronic braking system (EBS) controller electronically coupled to the hand control unit and responsive to a first brake request signal from the hand control unit to provide the vehicle with the secondary brake functionality; and
   an electronic brake module (EBM) electronically coupled to the hand control unit and responsive to a second brake request signal from the hand control unit to provide the vehicle with the secondary brake functionality when the EBS controller is unable to respond to the first brake request signal from the hand control unit to provide the vehicle with the secondary brake functionality.

10. The parking brake apparatus according to claim 9, wherein the secondary brake mechanism further comprises:
- a redundant foot brake module for providing the vehicle with the secondary brake functionality; and
- a booster electrically coupled to the hand control unit and responsive to a second brake request signal from the hand control unit to activate the redundant foot brake module to provide the vehicle with the secondary braking functionality when the EBS controller is unable to respond to the first brake request signal from the hand control unit to provide the vehicle with the secondary brake functionality.

* * * * *